March 4, 1958    O. E. ZUIDERHOEK    2,825,526
GATE VALVE
Filed Jan. 2, 1957
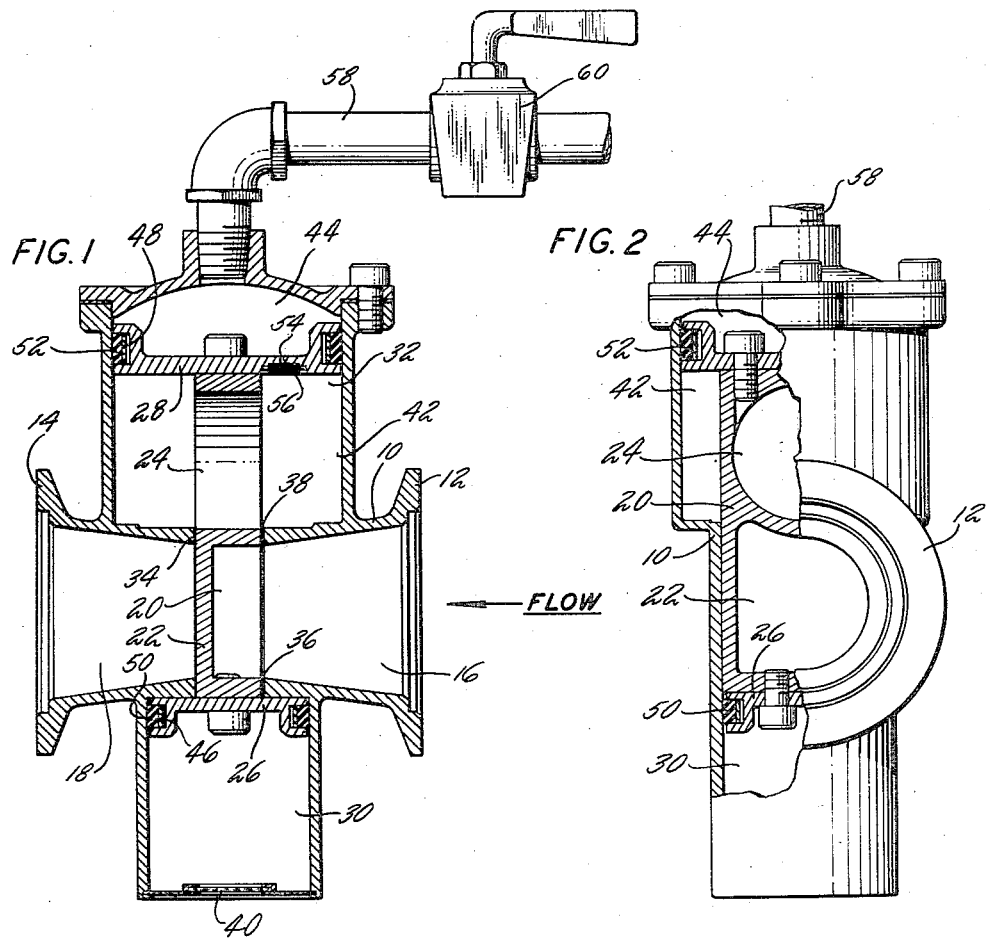
INVENTOR
OTUS E. ZUIDERHOEK
BY Harris & Luther
ATTORNEY

United States Patent Office 2,825,526
Patented Mar. 4, 1958

2,825,526

GATE VALVE

Otus E. Zuiderhoek, Glastonbury, Conn., assignor to United Aircraft Corporation, East Hartford, Conn., a corporation of Delaware Application January 2, 1957, Serial No. 632,223

4 Claims. (Cl. 251—44)

This invention relates to valves and particularly to operating mechanism for high temperature valves.

In pneumatic systems for modern aircraft, it is often necessary to provide valves for handling air at temperatures on the order of 400° F. or above. The past practice has been to actuate a valve by means of a diaphragm, but difficulties with the diaphragm arise at the elevated temperatures. To minimize such difficulties, the usual practice is to remove the diaphragm from the actual valve member as far as possible, and incorporate cooling means of various types into the diaphragm chamber. The improved design to be described eliminates these difficulties by the elimination of the diaphragms and substitution of piston and cylinder assemblies.

An object of the present invention is a servo-actuated valve suitable for high temperature operation.

Another object is a valve servo mechanism utilizing the controlled fluid as the power source for moving the valve in both closing and opening movements.

A still further object is a valve leaking pressure fluid into opposed operating chambers while assisting in seating said valve and mechanism for controlling the actuation of the valve by controlling the leakage from a third chamber.

Other objects and advantages will be apparent from the following specification and the attached drawing in which:

Fig. 1 is a side elevation partly in section of the valve and its operating mechanism.

Fig. 2 is an end elevation partly in section of the valve of Fig. 1.

Referring to Fig. 1, the valve comprises a body 10 having flanges 12 and 14 adapted to connect respectively with any suitable source of fluid pressure supply and a discharge such as a pipe or conduit not shown. Flange 12 is arranged around an inlet passage 16 in the valve body 10 and is adapted to be connected to a source of fluid pressure. Flange 14 surrounds an outlet passage 18 leading to a fluid discharge line. Passages 16 and 18 are aligned and form a flow channel through the valve body. The gate 20 is slidable across the flow channel between passages 16 and 18 and acts in the position shown in Fig. 1 to block the flow channel with the solid portion 22 of the gate. The gate is movable from the position shown of Fig. 1 to a lower position, not shown, in which the aperture portion 24 of the gate member 20 would be placed in alignment with the passages 16 and 18 and thus open the valve and provide a smooth wall surface in the duct through the valve without the usual pockets in the wall as in the ordinary gate valve.

Gate member 20 is movable across the flow channel by means of pistons 26 and 28. Piston 26 is arranged in a channel 30 located at one side of the gate member 20 and piston 28 is located at the opposite side of the gate member 20 in another chamber 32 dividing that chamber into two compartments 42 and 44. Pistons 26 and 28 are secured to and movable with the gate member 20.

As shown in Fig. 1, pressure fluid applied to the inlet side of the gate 20 will force the gate to the left against the seat 34 to form a fluid-tight joint between the gate and the body 10 and force the gate longitudinally of the flow channel away from the opposite side of the body 10 to form bleed channels 36 and 38 between the gate and the body leading to the chamber 30 and the compartment 42, respectively.

Chamber 30 is vented to atmosphere through a filter 40. Springs 46 and 48 are arranged back of the sealing rings 50 and 52 in the ring grooves of the pistons 26 and 28 so as to permit transverse movement of the rings with respect to the piston to permit movement of the gate valve 22 longitudinally of the flow channel without interfering with the piston seals. A continuously open bleed 54 through the piston 28 and a filter 56 connects compartment 42 with compartment 44. Compartment 44 is vented through a pipe 58 controlled by a valve 60 shown as manually actuated, but which may be either manually or automatically actuated.

With the valve 60 open, fluid under pressure entering the chamber 16 and bleeding through passages 36 and 38 will introduce the fluid under pressure into chamber 30 and compartment 42 on the gate valve side of the pistons 26 and 28 which will build up the pressure under the pistons 26 and 28 until substantially equal. Valve 60 being open, there will be substantially no pressure in the chamber 44. Although bleed 54 is continuously bleeding air into chamber 44, the vent 58 will relieve the pressure as fast as it attempts to build up. Chamber 30 being vented at 40, there will be substantially no pressure under piston 26. Piston 28, having an area materially larger than the area of piston 26 exposed to the fluid pressure, will produce a predominating force tending to lift the valve to the position shown in Fig. 1 and thus move it to closed position. In the closed position, as explained above, the valve will be moved to the left to seat against the seat 34.

Upon closing the valve 60 to block the vent 58, pressure will build up in chamber 44 through the bleed 54 and thus substantially balance the pressure on the two sides of the piston 28; thus in effect, disabling the effect of that piston. The pressure acting on the gate valve side of the piston 26 will then predominate and force the gate 20 downward so as to align the aperture 24 with the passages 16 and 18 to thus open the valve and permit fluid flow therethrough. It will be understood that the lower side of piston 26 is continuously vented to atmosphere through the filter 40.

It will thus be seen that opening and closing of the vent valve 60 will effect opening and closing movement of gate 20, utilizing the force of the control fluid for actuating the valve.

The above structure is of particular utility when hot gases are to be controlled, in that the structure is substantially free of any devices that would be adversely affected by high temperatures and the control valve 60 may be located in a remote position away from hot air lines. The valve gate will be seated by the force of the fluid being controlled and the only leakage when the valve is closed will be the small leakage through the bleed orifice 54 and the vent 58 which, in the case of a hot air control as in an airplane air conditioning system, may be led overboard.

Although the now preferred embodiment has been shown and described herein, it will be apparent that various changes and modifications may be made in the construction and arrangement of the various parts without departing from the scope of this novel concept.

I claim:

1. In combination, a valve body, a movable valve member, chambers in said body each having one movable wall connected with said valve member and situated on opposite sides of said valve member, one wall operable to move said member to closed position and the other wall operable to move said member to open position, one wall having a larger area than the other, means continuously directing pressure fluid to said chambers, the other side of said other wall being vented, a third chamber in said body on the opposite side of said one wall, a bleed connecting said chamber on the opposite side of said one wall with the chamber on the one side of said one wall and means controlling a vent from said third chamber to selectively render one or the other of said walls effective to operate said valve.

2. A combination as claimed in claim 1 in which the means directing the pressure fluid comprises a leak passage between the valve and the valve body.

3. A valve having a valve body and a flow channel therethrough and adapted to control fluid flow through said channel comprising a sliding gate movable across said flow channel in said body to control the opening through said channel, said gate movable longitudinally of said passage by the pressure of the controlled fluid to seat said gate, a chamber located at one side of said gate, a movable partition in said chamber dividing said chamber into two closed compartments, a continuously open bleed line connecting said two compartments, means connecting said movable portion with said gate, said gate when seated providing a continuously open connection between said controlled fluid and one of said compartments, means controlling a vent from the other compartment, a second chamber located at the opposite side of said gate, and having a movable wall connected with said gate and having a smaller area than said partition, said gate when seated providing a continuously open connection between said controlled fluid and said second chamber the opposite side of said wall being vented.

4. A valve having a valve body and a flow channel therethrough, comprising, a sliding gate movable across said flow channel to control the opening through said channel, a cylinder located at one side of said gate, a piston in said cylinder dividing said cylinder into two closed compartments, a bleed line connecting said two compartments, means connecting said piston with said gate, means providing a continuous open connection between the upstream side of said flow channel and one of said compartments, a vent from the other compartment and means controlling said vent, a second cylinder located at the opposite side of said gate and having a piston located therein having a smaller area than said first-mentioned piston, one side of said last-mentioned piston being continuously connected with the upstream side of said flow channel and the other side of said last-mentioned piston being continuously vented.

References Cited in the file of this patent

UNITED STATES PATENTS 781,913     Shutte _____ Feb. 7, 1905